United States Patent [19]

Horowitz

[11] 4,121,066

[45] Oct. 17, 1978

[54] CIRCUIT BREAKER ADAPTER

[75] Inventor: Charles Horowitz, Niles, Ill.

[73] Assignee: Sloan Valve Company, Franklin Park, Ill.

[21] Appl. No.: 807,022

[22] Filed: Jun. 16, 1977

[51] Int. Cl.[2] ........................ H02B 1/10; H01H 37/52; H01H 61/01

[52] U.S. Cl. .................................. 200/51 R; 337/113; 339/10; 361/332; 361/349; 361/427

[58] Field of Search ....... 200/51 R, ; 337/1, 186–189, 337/197, 198, 208, 209, 213, 215, 283, 143–145, 167, 191; 339/10, 126 R; 361/331, 332, 349, 380, 425, 427, 431

[56] References Cited

U.S. PATENT DOCUMENTS

| | | | |
|---|---|---|---|
| 3,270,249 | 8/1966 | Unsworth | 337/113 X |
| 3,315,131 | 4/1967 | Klimak et al. | 337/113 X |
| 3,601,660 | 8/1971 | Brandt et al. | 339/10 |
| 3,614,537 | 11/1969 | Introvigne | 361/332 |

FOREIGN PATENT DOCUMENTS

| | | | |
|---|---|---|---|
| 771,791 | 11/1967 | Canada | 337/1 |

*Primary Examiner*—Stephen Marcus
*Attorney, Agent, or Firm*—Kinzer, Plyer, Dorn & McEachran

[57] ABSTRACT

A circuit breaker adapter that is mounted with any conventional electrical connector receptacle to the truck-trailer body. The circuit breaker adapter is constructed so that it is secured by existing mounting bolts of the connector receptacle in order to minimize installation expenses. The circuit breakers are removably locked to the adapter so that they may be individually replaced when necessary.

3 Claims, 6 Drawing Figures

Fig. 1.
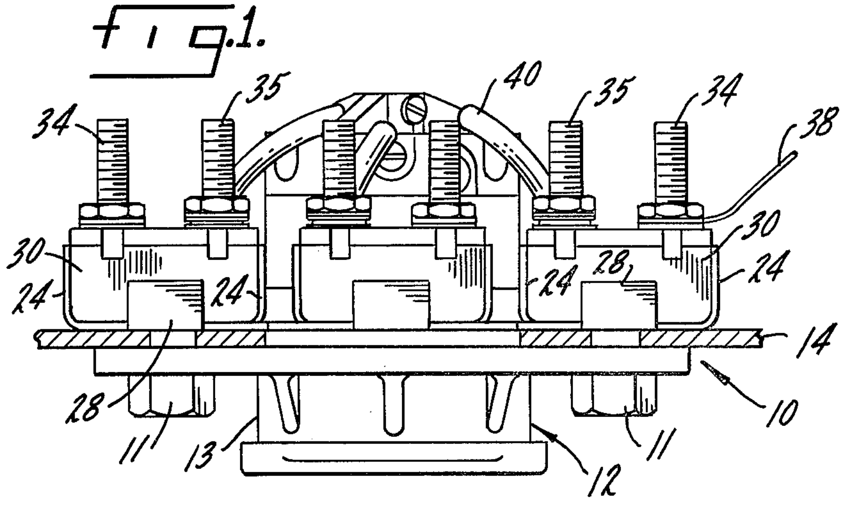
Fig. 4.
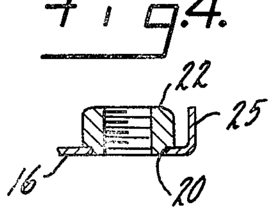
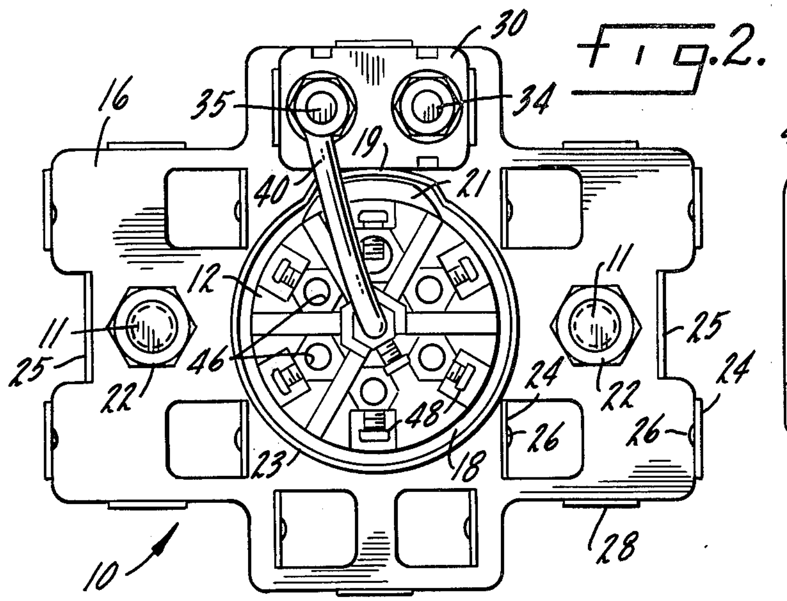
Fig. 2.
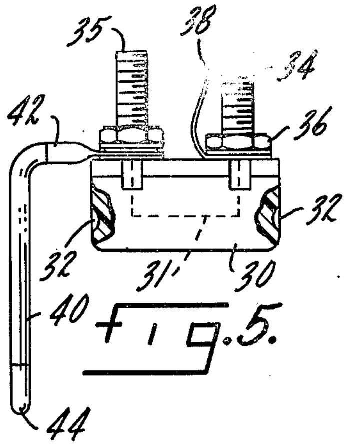
Fig. 5.
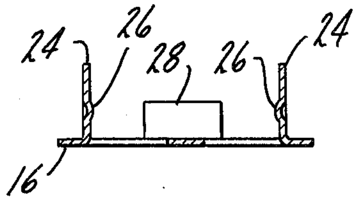
Fig. 6.
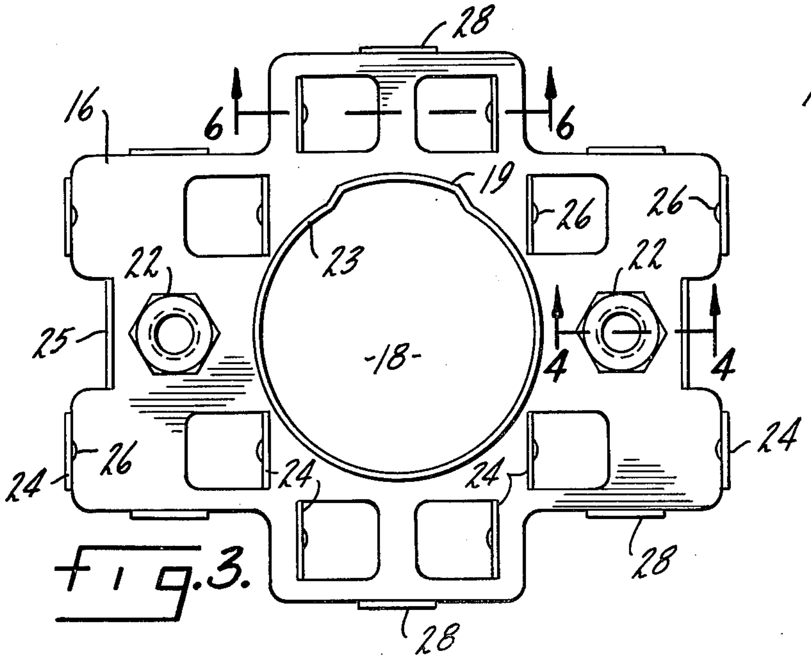
Fig. 3.

CIRCUIT BREAKER ADAPTER

SUMMARY OF THE INVENTION

The present invention relates to a circuit breaker adapter to be used in conjunction with electrical connector receptacles in order to avoid damage to the electrical devices and power source. A conventional receptacle does not have circuit breaking means, while other receptacles have integral circuit breaking means which can only be used with a particular receptacle design and not with conventional receptacles. Formerly, in order to convert a system employing a conventional receptacle to one with circuit breaker protection, the conventional receptacle had to be removed and replaced by a new receptacle with integrated circuit breaking means.

The primary purpose of the present invention is a circuit breaker adapter for converting conventional receptacles to receptacles with circuit breaking means.

Another purpose of the invention is a circuit breaker adapter which is easily installed by securing the adapter with the mounting bolts of a conventional receptacle.

Another purpose of the invention is a circuit breaker adapter with removably locked circuit breaker elements which are easily replaced when necessary.

Another purpose of the invention is a circuit breaker adapter which can be salvaged when the receptacle has been damaged, and reused with a substituted receptacle.

Other purposes will appear in the ensuing specifications, drawings and claims.

BRIEF DESCRIPTION OF THE DRAWINGS

The invention is illustrated in the drawings wherein:

FIG. 1 is a side view of the circuit breaker adapter and connector receptacle as mounted to the trailer body;

FIG. 2 is a rear plan view of the circuit breaker adapter mounted on the receptacle, showing one circuit breaker in place;

FIG. 3 is a rear plan view of the circuit breaker adapter mounting plate only;

FIG. 4 is a sectional side view of a mounting nut taken along the line 4—4 of FIG. 3;

FIG. 5 is a side view of a circuit breaker with a fragmentary sectional view revealing the recesses; and FIG. 6 is a sectional side view along the line 6—6 of FIG. 3 of a pair of receiving flanges.

DESCRIPTION OF THE PREFERRED EMBODIMENT

The circuit breaker adapter is indicated generally at 10 and is mounted with a conventional connector receptacle 12 to the trailer body 14 of a tractor-trailer truck combination. The particular construction of the circuit breaker adapter assembly lends itself to such application, although the invention should not be so limited. Receptacle 12 has an annular wall 13 defining an opening which will receive a conventional plug (not shown).

Turning particularly to circuit breaker adapter assembly 10, as shown in FIGS. 2 and 3, a generally flat mounting plate 16 has a centrally located generally circular opening 18. On the circumference 23 of opening 18 is keyway 19 which cooperates with receptacle key 21 to insure proper alignment of mounting plate 16 with receptacle 12. In mounting plate 16 are a pair of mounting holes 20 adjacent to opening 18. Holes 20 align with the standard spacing of mounting bolts 11 used with a conventional receptacle as seen in FIG. 1. Welded or otherwise attached onto the rear face of mounting plate 16 are nuts 22 in alignment with holes 20. Located about the perimeter of mounting plate 16 are six pairs of generally rectangular upstanding flanges 24 projecting from the rear face of plate 16. As seen in FIG. 6, on one side of each of the flanges 24 is a punched out projection or nipple 26 protruding inward toward the other flange of its pair. Located at the perimeter of plate 16 are upstanding members 28 spaced an equal distance from flanges 24 and projecting in the same direction as the flanges 24. The purpose of member 28 will become apparent later.

A circuit breaker indicated at 30 as seen best in FIG. 5, is of the conventional type, generally rectangular in shape, with two electrical terminals or posts 34, 35. Internally connected to posts 34, 35 is fusable link 31 which will cause the electrical circuit to open when the system has been overloaded. Formed in the opposite ends of circuit breaker 30 are recesses 32 which are positioned so that when circuit breaker 30 is inserted between flanges 24, recesses 32 will cooperate with nipples 26 to removably lock or snap circuit breaker 30 in place. Circuit breaker 30 may be additionally secured in place by member 28 acting upon one side, and either member 25, the ridge at keyway 19 or the ridge at opening 18 acting upon the other side of circuit breaker 30. Member 25 also serves to provide lateral reinforcement of plate 16. Terminals 34, 35, located within circuit breaker 30 extend outwardly from body 30 and are threaded. Threaded on post 34 is a nut 36 to secure a wire connection 38 from the electrical harness (not shown). A second wire 40 with eyelet type spade clip 42 at one end is secured to electrical post 35. Wire 40 has rounded, soldered tip 44 which is inserted into conventional receptacle receiving hole 46 and secured by wire bolt 48.

While many receptacles have a receiving means similar to hole 46 and bolt 48, other receptacles may have different means for securing electrical wires. Other means, rather than tip 44, may therefore be optionally provided with the circuit breaker adapter to suit the requirements of the particular receptacle.

Installation of the circuit breaker assembly to a previously mounted receptacle is as follows: Wire bolts 48 are loosened and the electrical harness wire connections are removed from hole 46. The receptacle mounting nuts are removed and discarded. The circuit breaker adapter plate 16, fitted with circuit breakers 30, is slipped over the rear of receptacle 12 through opening 18. The adapter 10 and receptacle 12 are then secured to trailer body 14 by mounting bolts 11 and nuts 22. Circuit breaker wires 40 are inserted and secured to the proper receptacle holes 46. The electrical harness wires are then secured to the proper circuit breaker at posts 34.

Whereas the preferred form of the invention has been shown and described herein, it should be realized that there may be many modifications, substitutions and alterations thereto.

The embodiments of the invention in which an exclusive property or privilege is claimed are defined as follows:

1. A circuit breaker conversion adapter for use on a conventional electrical connector receptacle not having circuit breakers thereon, said adapter comprising a mounting plate having a generally circular opening for positioning said plate on a connector receptacle, said mounting plate having spaced holes positioned for alignment with the conventional mounting bolts of a connector receptacle, said mounting plate having upstanding flange means, a plurality of circuit breakers, said circuit breakers and flange means having cooperating mounting means thereon, each circuit breaker having an electrical terminal adapted to receive a wire from an electrical harness, each circuit breaker having a second electrical terminal for receiving one end of a second wire which is adapted to be connected to a contact pin of an electrical connector receptacle.

2. The structure of claim 1 further characterized in that said flange means are arranged in pairs with each of said pairs having one of said circuit breakers removably mounted therebetween, a plurality of upstanding members positioned on said mounting plate adjacent each of said pairs, and a ridge on the rear face of said mounting plate around said opening, said upstanding members and said ridge acting to additionally secure said circuit breakers on said mounting plate.

3. The structure of claim 2 further characterized in that said flange means each include a nipple protruding toward the other flange of its pair, each circuit breaker having a recess on opposite sides thereof, said recesses cooperating with said nipples to lock said circuit breakers between said flange pairs.

* * * * *